United States Patent [19]

Lodico et al.

[11] Patent Number: 5,784,985
[45] Date of Patent: Jul. 28, 1998

[54] MECHANICAL SEED METER

[75] Inventors: James Irwin Lodico, Hampton; Terry Lee Snipes, East Moline; Donald Raymond Wisor, Moline, all of Ill.

[73] Assignee: Deere & Company, Moline, Ill.

[21] Appl. No.: 789,225

[22] Filed: Jan. 24, 1997

Related U.S. Application Data

[63] Continuation-in-part of Ser. No. 610,644, Mar. 4, 1996, Pat. No. 5,720,233.

[51] Int. Cl.⁶ .................................................. A01C 7/00
[52] U.S. Cl. .......................... 111/184; 221/254; 221/265; 221/277
[58] Field of Search ........................ 111/184, 183, 111/182, 181, 185, 178, 177, 77; 221/211, 263, 266, 278, 254, 265, 277

[56] References Cited

U.S. PATENT DOCUMENTS

| | | | |
|---|---|---|---|
| 2,835,133 | 5/1958 | Rogers et al. | |
| 3,486,659 | 12/1969 | Beebe et al. | 221/277 |
| 3,552,601 | 1/1971 | Hansen et al. | 111/77 |
| 4,162,744 | 7/1979 | Barker et al. | 111/77 X |
| 4,282,985 | 8/1981 | Yamamoto | 221/254 |
| 4,450,979 | 5/1984 | Deckler | 221/263 |
| 4,609,131 | 9/1986 | Tieben | |
| 4,735,036 | 4/1988 | Alexander | |
| 4,924,786 | 5/1990 | Keeton | 111/184 |
| 5,027,725 | 7/1991 | Keeton | 111/184 |
| 5,058,766 | 10/1991 | Deckler | 221/254 |
| 5,170,909 | 12/1992 | Lundie et al. | 221/211 |
| 5,549,060 | 8/1996 | Schick et al. | 111/178 |

FOREIGN PATENT DOCUMENTS

| | | |
|---|---|---|
| 168183 | 6/1951 | Austria . |
| 2368872 | 5/1978 | France . |
| 2829156 | 1/1980 | Germany . |
| 2630973 | 6/1980 | Germany . |
| 3615189 | 4/1987 | Germany . |
| 403379 | 6/1966 | Switzerland . |
| 702728 | 1/1954 | United Kingdom . |

*Primary Examiner*—Michael J. Carone
*Assistant Examiner*—Christopher J. Novosad

[57] ABSTRACT

A mechanical seed meter having a stationary housing and a rotatable bowl. The stationary housing is provided with a first axial wall, an outer radial wall and a flexible inner radial wall. The bowl is provided with seed receiving cells that form a second axial wall for trapping singled seeds in the seed trapping area. A flexible and resilient flap maintains the seed in the seed receiving cells. An axially extending brush removes excess seeds from the seed receiving cells as they pass through the seed puddle before entering the seed trapping area. The seed slides along the radial outer wall by centrifugal force until it enters the outlet area from which the outer radial wall becomes part of the outlet and the metered seed is deposited through the outlet to a seed tube. Jammed seed, that is seed trapped in the seed receiving cells, are provided with a downward force by a bump located in the outlet and an upward force by a rotatable wheel located downstream from the outlet.

11 Claims, 4 Drawing Sheets

MECHANICAL SEED METER

This application is a Continuation-In-Part of U.S. patent application Ser. No. 06/610,644 filed 4 Mar. 1996, now U.S. Pat. No. 5,720,233.

BACKGROUND OF THE INVENTION

1. Field of the Invention

The invention is directed to improvements in a mechanical seed meter which can be used on planters, grain drills and air seeders.

2. Description of the Prior Art

In the United States the vast majority of crops are planted with row crop planters, grain drills or air seeders. Row crop planters are designed to place seeds in rows far enough apart to permit the control of weeds by cultivation and to improve harvesting efficiency. Grain drills and air seeders are used in solid planting, when row spacing is too close to permit cultivating or other cultural practices.

All three seeding machines, meter seed so it can be planted uniformly in a field. The row crop planters usually have the more sophisticated metering equipment for singling seeds, whereas the drills and air seeders use volumetric meters which apply a fixed volume of seed per linear foot.

Singling mechanical seed meters used on planters include seed plate meters, finger pickup meters and "brush meters". A seed plate seed meter is a mechanical seed meter having a rotating plate located at the bottom of the seed hopper. The plate is provided with seed cells in which the seed is trapped. If the cells are the correct size, only one seed will be trapped in each cell. The plate is then rotated over the discharge area and the seed released. U.S. Pat. Nos. 3,486,659, 4,282,985, and 4,609,131 disclose various configurations for seed plate type seed meters.

Another mechanical seed meter is the finger pickup seed meter. This meter is used for corn and comprises a series of fingers that pass through the seed reservoir. The fingers are initially open in the seed reservoir and then close trapping seed between the fingers and a stationary plate. Additional seed trapped by the fingers is removed by passing the fingers over indentations in the stationary plate as the seed is transported to the discharge area where the finger is opened releasing the seed. One example of a finger pickup meter is disclosed in U.S. Pat. No. 3,552,601.

Recently "brush meters" have been used for metering soybeans, sorghum, cotton, etc. A vertical rotating seed plate having a plurality of seed cells around its periphery passes through the seed reservoir. Seed is trapped in the seed cells by brushes. Examples of "brush meters" are disclosed in U.S. Pat. Nos. 4,924,786, 5,027,725 and 5,058,766.

SUMMARY

It is an object of the present invention to provide a simple mechanical seed meter for singling seeds. The subject seed meter can be used on row crop planters, grain drills and air seeders.

The seed meter of the present invention comprises a stationary housing having an inlet for receiving seeds from a seed hopper and an outlet through which the metered seeds are dispensed into a seed tube. The stationary housing is provided with a seed trapping zone formed by a first axial wall, an outer radial wall and a radially extending brush defining a inner radial wall. The radially extending brush extends circumferentially from the seed puddle past the meter outlet. The seed trapping zone extending circumferentially about a portion of the inner periphery of the housing. A bowl having a plurality of seed receiving cells about its periphery is rotatively mounted to the housing by a hub. The seed receiving cells cooperating with the seed trapping zone to trap single seeds therein.

The seed receiving cells of the bowl pass through a seed puddle formed between the bowl and the stationary housing picking up seeds. Seed caught in the seed receiving cells of the rotating bowl pass beneath a flexible and resilient flap which lightly presses and maintains the seeds received in the seed cells while loosening any double seeded cells. An axially extending brush located a short distance downstream from the flexible and resilient flap drives excess seeds away from the seed receiving cell. As the trapped seed passes the axially extending brush it enters the seed trapping zone and is held therein by the seed receiving cells until released to the outlet. The seed is released by removing the outer radial wall so that the seeds fall into the outlet. The radially extending brush prevents seed from entering the outlet directly from the seed puddle. A radially extending bump is formed in the brush in the outlet to release any seeds that might become wedged in the seed receiving cells.

An upward biassed wheel is located immediately downstream from the outlet and contacts the outer rim of the bowl. Seeds stuck in the seed receiving cells are pushed upwardly by the wheel loosening the seeds so they can release from the seed receiving cell on the next pass.

DETAILED DESCRIPTION

Figure 1:
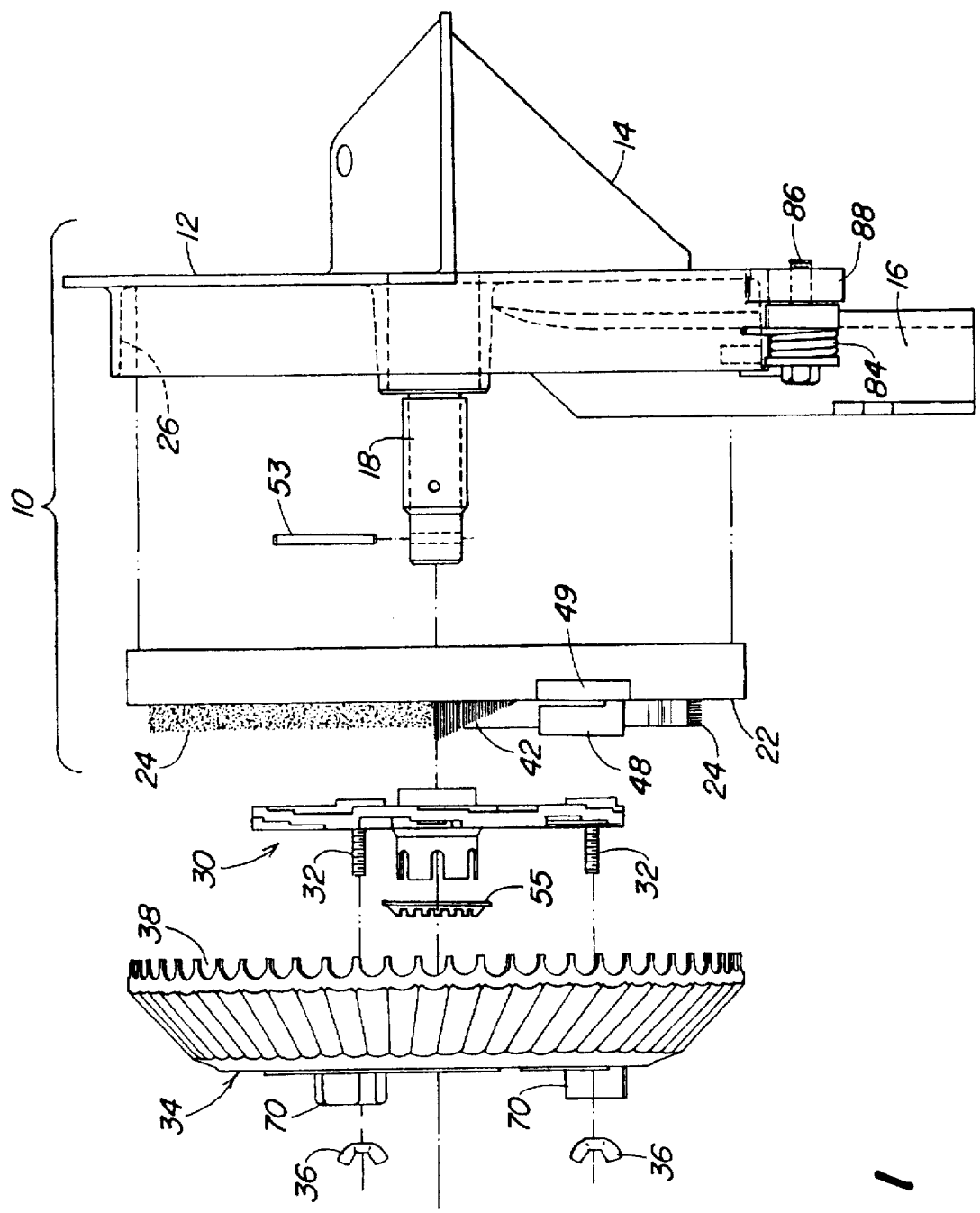
FIG. 1 is an exploded view of the subject seed meter.
Figure 2:
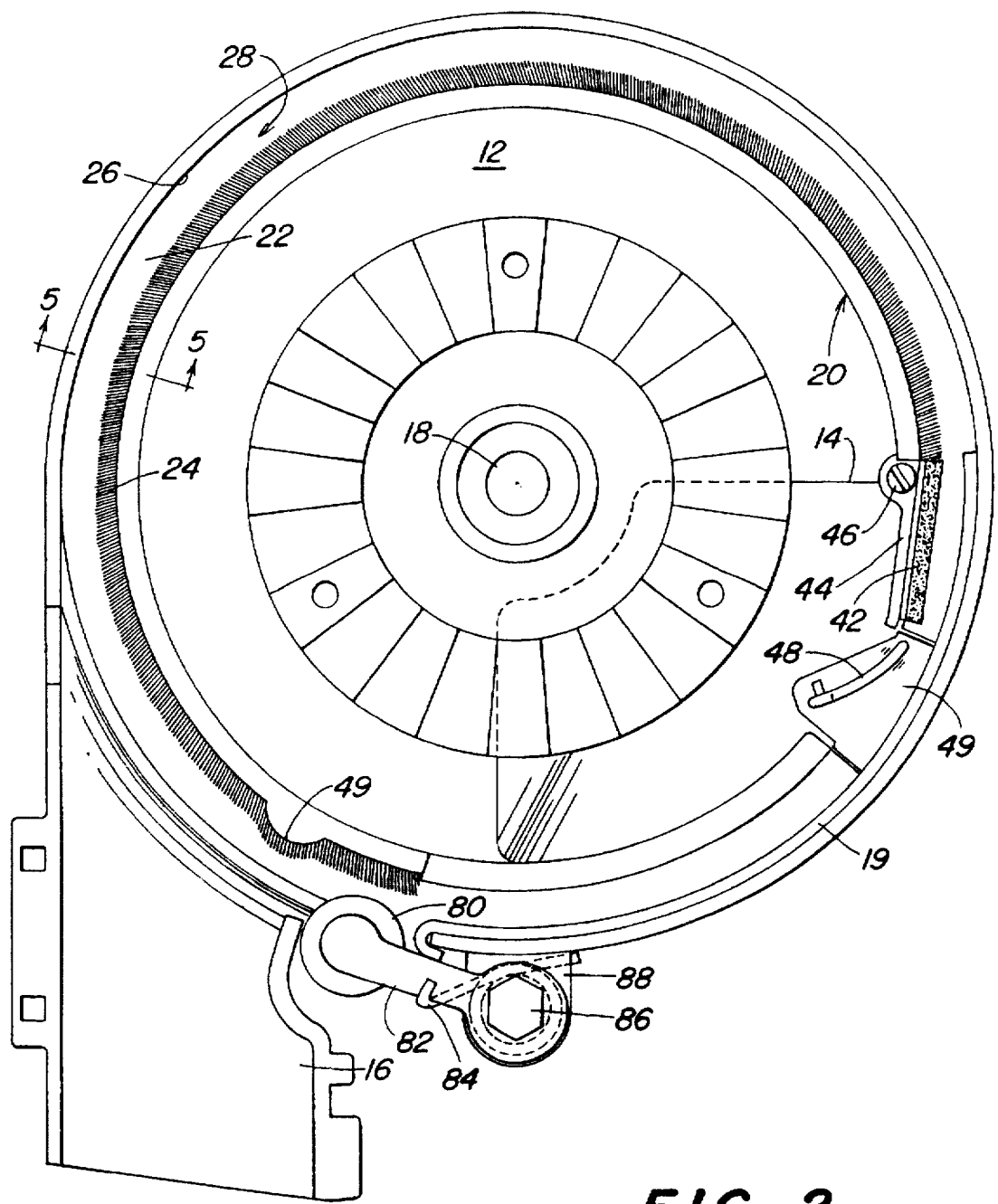
FIG. 2 is a side view of the housing and hub of the seed meter.

FIG. 1 is an exploded view of the subject seed meter. The subject seed meter may be used on row crop planters, grain drills and air seeders. It is particularly useful in row crop planters and more specifically for use with soybeans and other crops. The meter comprises a stationary housing 10 having two elements. The first element is a solid metallic unit 12 which is provided with a seed inlet 14 (see FIG. 3) and a seed outlet 16. Unit 12 is provided with a axially extending spindle 18 to which the rotatable elements of the seed meter are attached. A wear strip 19 is mounted to the inner wall of unit 12 by tangs, not shown, that engage mounting holes in the unit. The wear strip is formed of resilient metal having a greater radius than the unit so that it stays in place when mounted to the unit.

Figure 5:
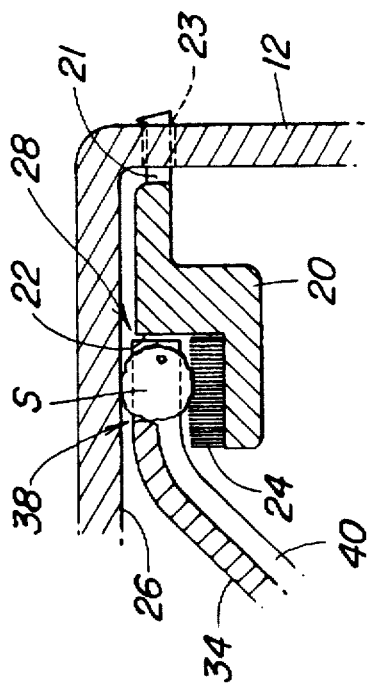
FIG. 5 is a cross sectional view taken along line 5—5 showing the seed trapping zone of the seed meter.

The second housing element comprises a plastic ring 20 which is secured to the first housing element 12 by plastic tangs 21, see FIG. 5. Tangs 21 are received in receiving apertures 23 formed in unit 12. The plastic ring defines a first axial wall 22 and a radially extending flexible member 24 comprising a brush. The first axial wall 22 and the radially extending brush 24 together with the outer radial wall 26, form a seed trapping zone 28 for trapping single seeds S, best shown in FIG. 5

Figure 3:
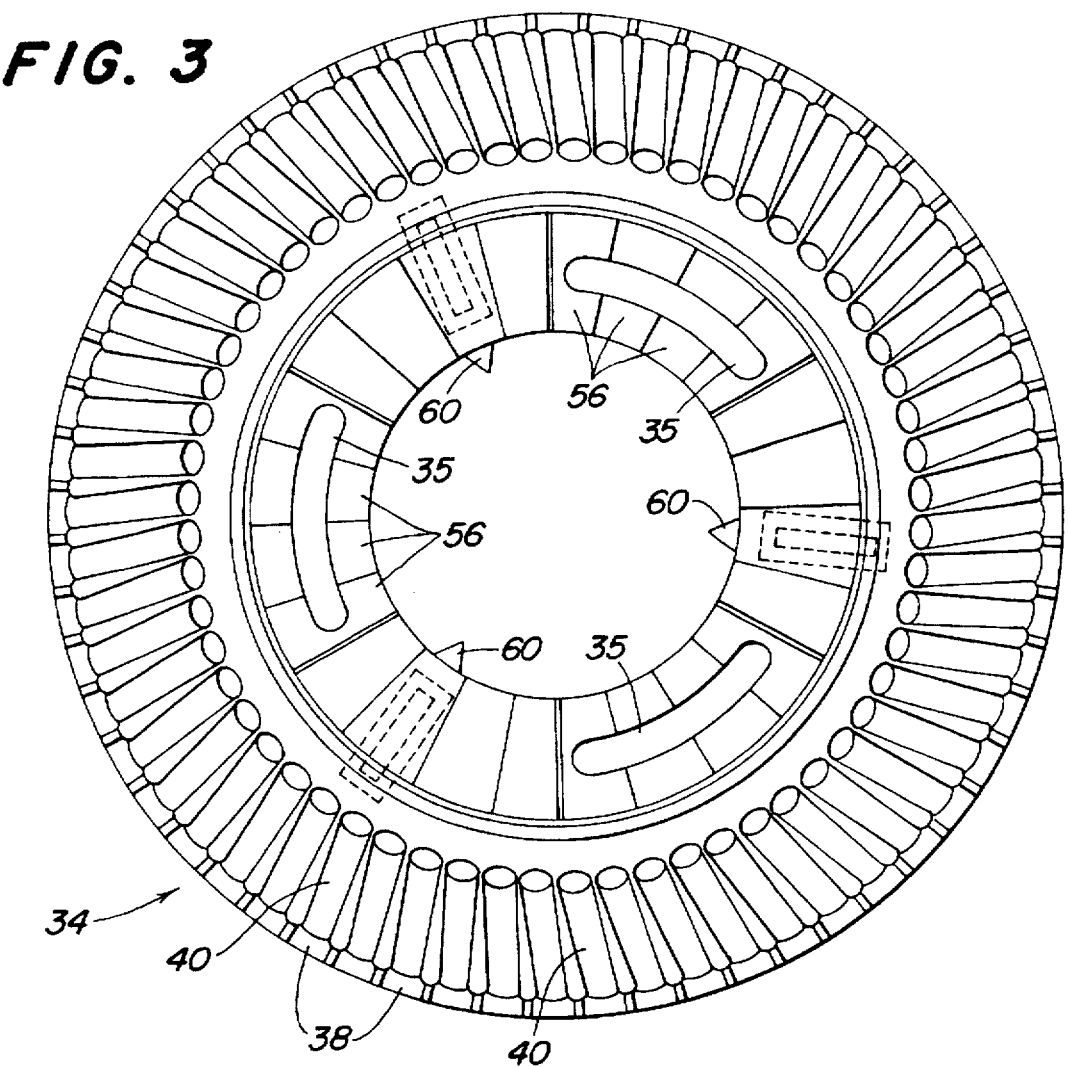
FIG. 3 is a side view of the bowl of the seed meter.
Figure 4:
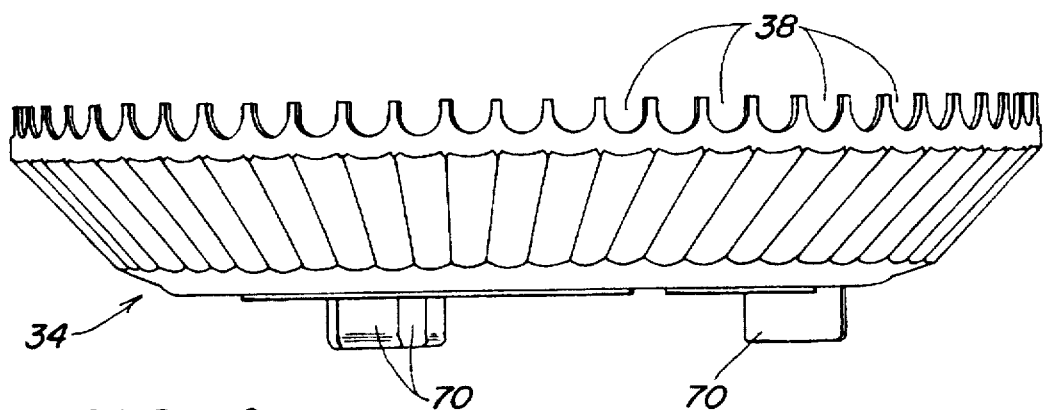
FIG. 4 is a front view of the bowl of the seed meter.

A hub 30 is rotatably mounted on spindle 18 and is provided with three screws 32. A bowl 34 is mounted to hub 30 by passing the screws 32 through curved slots 35 formed in the bowl and securing the bowl thereto by wing nuts 36. The bowl is best illustrated in FIGS. 3 and 4, it comprises a series of seed receiving cells 38 which are located around the axial periphery of the bowl. Each cell is provided with an inwardly extending groove 40 which helps to introduce seeds into the seed receiving cell 38. The width and depth of the grooves becomes smaller as the groove approaches the seed receiving cell. As seen in FIG. 5, the seed receiving cells 38 form a second axial wall in the seed trapping zone to trap singled seeds. In addition, rotation of the seeds by the bowl 34 imparts a centrifugal force on the seeds forcing them radially outward against the outer radial wall 26.

The ring adjacent to the seed puddle is provided with a flexible and resilient flap 48. The flap is provided with a base 49 that is mounted to the ring. The flap imparts a light downward force on the seed to maintain single seeds in the seed receiving cells. The ring is also provided with an axially extending flexible member 42 comprising a brush having a triangular configuration. This brush is located between the flap 48 and the seed trapping zone. This brush is held in place by a mounting plate 44. The mounting plate 44 is also provided with a screw 46 which is screwed into ring 20 for securing the mounting plate to the ring.

In operation, seeds from a seed reservoir are deposited in the seed meter through inlet 14. The seeds collect in a puddle formed between the seed bowl 34 and the housing 10. As the bowl is rotated in a counterclockwise direction, seeds in the seed puddle are directed into the seed receiving cells 38 by the grooves 40. After they enter the cell single seeds are held in place by the flexible and resilient flap 48. The axially extending brush 42 drives the excess seeds away from the seed cells so that only one seed remains in each seed cell before it enters the seed trapping zone. As the seed enters the seed trapping zone it is forced radially outward by centrifugal force against the outer radial wall 26 which is formed in the unit 12. It is kept axially in place by the first axial wall 22 and the second axial wall formed by seed receiving cell 38. The radially extending brush 24 forms the inner radial wall of the seed trapping zone. Brush 24 holds the seed in the seed receiving cells when the meter is stopped and when gravity exceeds the centrifugal force of the rotating bowl acting on the seed. The brush 24 also provides a flexible area to compensate for overfilled seed receiving cells without breaking various components. As the seed enters the outlet area, the outer radial wall 26 falls away and forms part of the outlet 16. In this way the seed is dropped into the outlet. The outlet in turn is coupled to a seed tube which directs seed into the planting furrow. To prevent seeds in the seed puddle from short circuiting the seed meter, the brush 24 extends past the meter outlet. A radially protruding bump 49 formed in ring 20 imparts a downward force on any seed that maybe wedged in a seed receiving cell, so that the seed receiving cell is open to be refilled during its next rotation through the seed puddle. In addition a rotatable plastic wheel 80 located immediately downstream from the outlet provides an upward force to dislodge jammed seed. The rotatable plastic wheel is rotatably mounted to a pivot link 82 that is biassed upwardly by spring 84. The spring encircles a mounting bolt 86 on which the pivot arm is mounted. The mounting bolt in turn is mounted to a boss 88 extending from unit 12.

Figure 6:
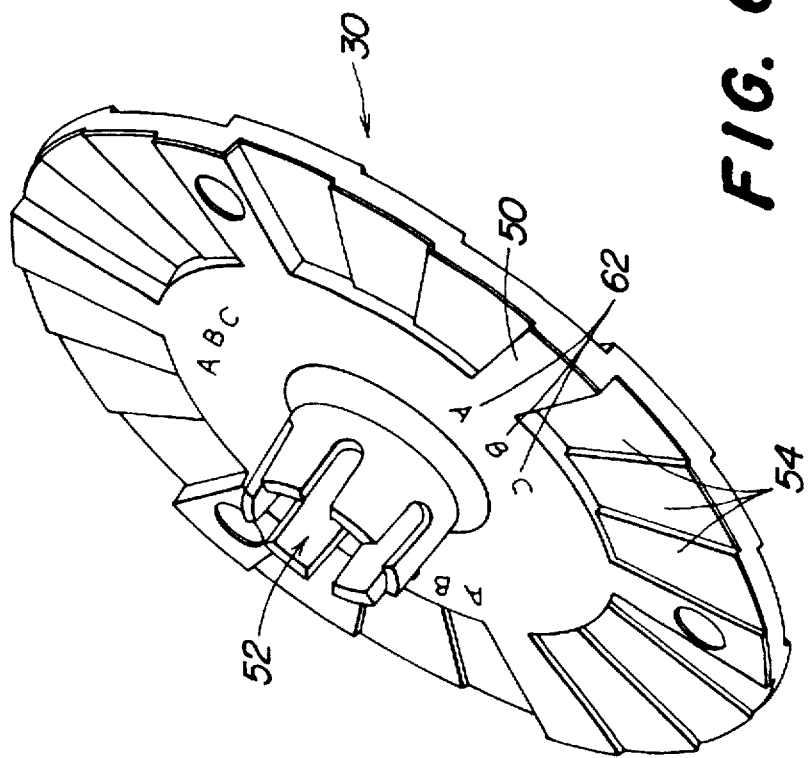
FIG. 6 is a perspective view of the hub.

The hub 30, best illustrated in FIGS. 1 and 6 is a plastic disk member 50 having an annular bore 52. The annular bore is mounted to spindle 18 and held in place by pin 53 and retaining ring 55. The periphery of the disk member 50 is provided with a series of steps 54 which correspond to steps 56 formed in the bowl 34. These steps comprise a means for adjusting the axial position of the bowl relative to the stationary housing 10. By adjusting the rotative position of the bowl 34 relative to the hub 30, the axial distance of the bowl 34 relative to the stationary housing 10 can be controlled. An indicator means comprising a pointer 60 on bowl 34 and indicator marks 62 on hub 30 are used to inform the farmer of the position of the bowl relative to the hub. By checking a chart the farmer can then determine the size of the individual seed trapping areas and change the relationship for different seed sizes. The spindle 18 is provided with a coupling member, not shown, for coupling the spindle to a source of rotative power for rotating the hub and bowl.

Another feature that should be identified are finger catches 70 which extend axially outwardly from the bowl and are used to assist the farmer in rotating the bowl relative to the hub when adjusting the axial position of the bowl relative to the hub. In addition the finger catches 70 are used to space the bowls when stacked to protect the seed receiving cells.

To calibrate the meter, the spindle 18 and the hub bore 52 are provided with threads. During calibration the deepest step 54 is set so that the bowl is screwed onto the spindle until the teeth of the seed receiving cells contact the first axial wall 22. Calibration is then locked using a split pin inserted through the shaft and hub. This calibrating position has no indicating label.

The present invention should not be limited by the above described embodiments, but should be limited solely by the claims that follow.

We claim:

1. A seed meter for an agricultural machine, the seed meter comprising:

a housing having an inlet for receiving seed and an outlet through which metered seed is dispensed, the housing being provided with an axial inner wall and an outer radial wall, a radially extending flexible member mounted to the housing defines an inner radial wall, the axial inner wall, the radial outer wall and the radial inner wall defining a seed trapping zone;

a bowl being rotatively mounted to the housing, the bowl having a series of individual seed receiving cells arranged about its axial periphery, the seed receiving cells rotatively move through the seed trapping zone, the seed receiving cells defining an axial outer wall for trapping the seeds in the seed trapping zone;

seed entering the housing through the inlet form a seed puddle between the housing and the bowl, individual seeds located in this puddle are taken up by the seed receiving cells in the bowl as it is rotated through the puddle and are trapped therein in the seed trapping zone, seed trapped in the seed receiving cells is released by the outer radial wall of the housing as the seed is rotated towards the outlet, wherein the housing is further provided with a flexible and resilient flap for maintaining seed in the seed receiving cells before entering the seed trapping zone.

2. The seed meter as defined by claim 1 wherein the outer radial wall of the housing releases the seed from the seed trapping zone by terminating at the outlet and beginning again after the outlet.

3. The seed meter as defined by claim 2 wherein the bowl is provided with a series of grooves corresponding to the individual seed receiving cells and extending inwardly therefrom.

4. The seed meter as defined by claim 3 wherein the axial inner wall is provided with an axially extending flexible member for driving excess seeds outwardly from the seed receiving cells before the seed receiving cells enter the seed trapping zone the flexible and resilient flap being located upstream from the axially extending flexible member.

5. The seed meter as defined by claim 4 wherein the radially extending flexible member and the axially extending flexible members are brushes.

6. The seed meter as defined by claim 5 wherein the radially extending flexible member is provided with a radially extending bump for imparting a downward force for pushing jammed seeds downwardly from the seed receiving cells.

7. The seed meter as defined by claim 6 wherein housing is provided with an upwardly biassed rotatable wheel located downstream from the outlet for pushing jammed seeds upwardly from the seed receiving cells.

8. The seed meter as defined by claim 7 the axial inner wall, the radially extending flexible member, the axially extending flexible member and the flexible and resilient flap are mounted to a ring that can be separated from the housing.

9. A seed meter for an agricultural machine, the seed meter comprising:

a housing having an inlet for receiving seed and an outlet through which metered seed is dispensed, the housing being provided with an axial inner wall and an outer radial wall, a radially extending flexible member mounted to the housing defines an inner radial wall, the axial inner wall, the radial outer wall and the radial inner wall defining a seed trapping zone;

a bowl being rotatively mounted to the housing, the bowl having a series of individual seed receiving cells arranged about its axial periphery, the seed receiving cells rotatively move through the seed trapping zone, the seed receiving cells defining an axial outer wall for trapping the seeds in the seed trapping zone;

seed entering the housing through the inlet form a seed puddle between the housing and the bowl, individual seeds located in this puddle are taken up by the seed receiving cells in the bowl as it is rotated through the puddle and are trapped therein in the seed trapping zone, seed trapped in the seed receiving cells is released by the outer radial wall of the housing as the seed is rotated towards the outlet, an upwardly biassed rotatable wheel is located immediately downstream from the outlet for imparting an upward force on jammed seed in the seed receiving cells.

10. The seed meter as defined by claim 9 wherein the rotatable wheel is rotatably mounted to a pivot link mounted to a boss on the housing.

11. The seed meter as defined by claim 10 wherein a biassing spring is located between the pivot link and the housing for biassing the rotatable wheel upwardly.

* * * * *